Patented Oct. 24, 1939

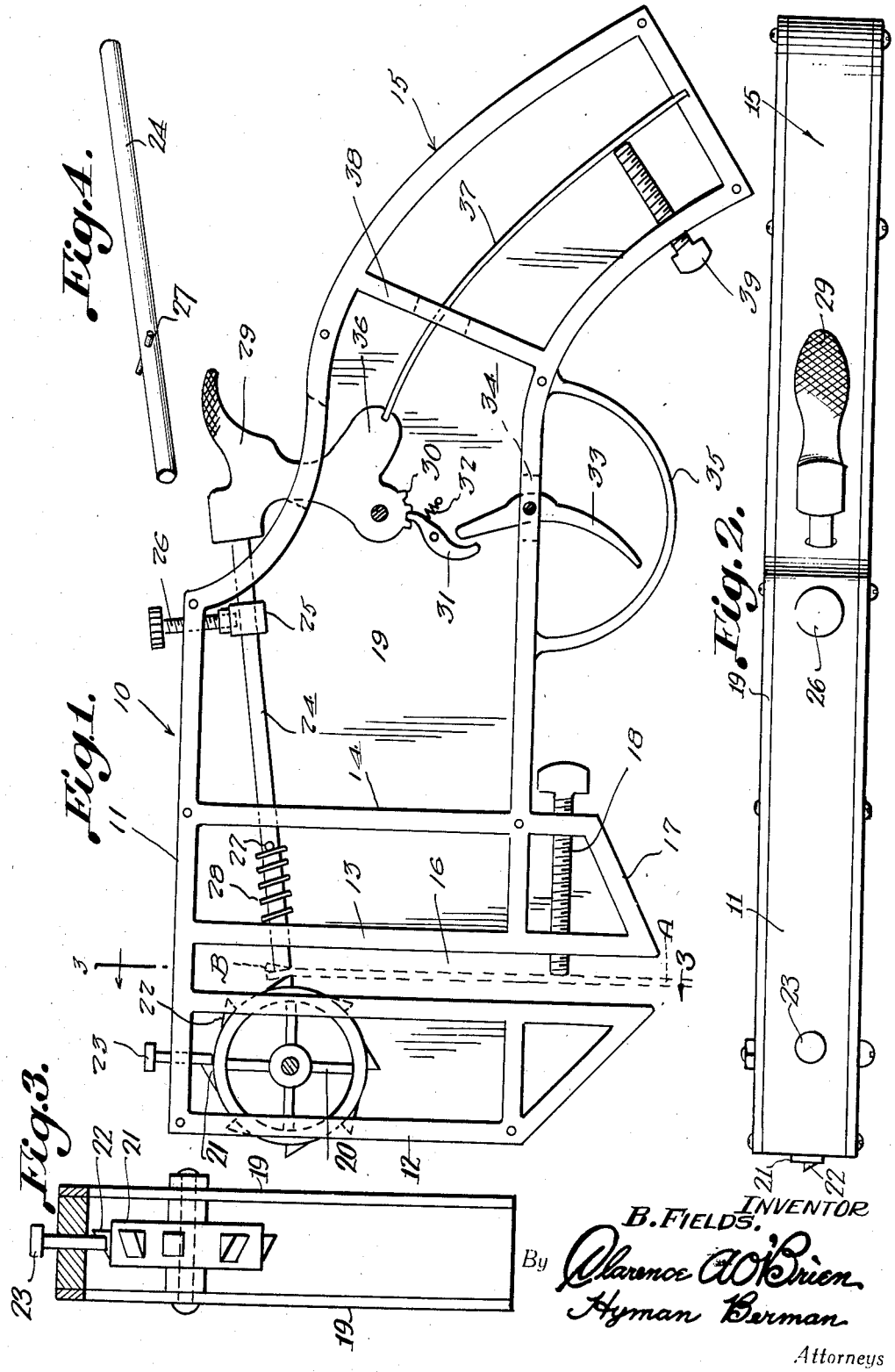

2,177,385

UNITED STATES PATENT OFFICE 2,177,385

SAW SET

Brownlow Fields, Laurel, Ind.

Application May 6, 1938, Serial No. 206,479

4 Claims. (Cl. 76—69)

This invention relates to saw sets and has for the primary object the provision of an efficient and inexpensive portable device of this character which will be convenient to handle and adaptable to a saw for uniformly setting the teeth thereof to a desired pitch and which may be easily adjusted to accommodate saws of different gages and may be further adjusted, so that different pitch sets may be had for teeth of different saws.

Another object of this invention is the provision of a device of the above stated character wherein the general construction and mode of operation simulates a pistol and which simplifies the mode of operation and handling of the device and permits its application to various types of saws and assures a uniform set of the saw teeth by always striking the teeth with a uniform force.

With these and other objects in view, the invention consists in certain novel features of construction, combination and arrangement of parts to be hereinafter more fully described and claimed.

For a complete understanding of my invention, reference is to be had to the following description and accompanying drawing, in which Figure 1 is a side elevation illustrating a saw set constructed in accordance with my invention.

Figure 2 is a top plan view illustrating the device.

Figure 3 is a transverse sectional view taken on line 3—3 of Figure 1.

Figure 4 is a perspective view showing a striking pin.

Referring in detail to the drawing, the numeral 10 indicates a main frame of substantially rectangular shape consisting of the longitudinally extending members 11, connected by an end member 12, relatively spaced vertically arranged members 13 and a vertically arranged member 14. The longitudinal members 11 after extending a selected distance parallel to each other are curved to form a handle 15 of a shape simulating a pistol grip.

The lower longitudinal member 11 is cutaway at the vertical members 13 so that the lower ends of said vertical members 13 extend a limited distance below said lower longitudinal member 11 to cooperate with each other in forming a saw receiving space or slot 16. The lower ends of the vertical members 3 are connected to the lower longitudinal member 11 by angularly related members 17, one of which cooperates with its respective vertical member 13 in forming a bracket to receive a set screw 18, the latter having threaded engagement with the bracket. The purpose of the set screw 18 is to engage one of the side faces of a saw blade when positioned in the slot or space 16, the saw blade being indicated by the character A and the teeth thereof by the character B.

Removably mounted on opposite sides of the frame 10 and the handle 15 are side plates 19 and journaled on said side plates is a wheel 20 carrying on its rim a plurality of relatively spaced anvils or saw set elements 21 each of substantially triangular shape presenting thereto a work engaging face 22. The work engaging faces of the various elements 21 are arranged at slightly different angles for the purpose of setting teeth of saws to different pitches. One of the members 13 and the end member 12 have aligning slots in which operates the wheel 20 so that said wheel projects beyond one end of the frame 10 and also projects into the saw space or slot 16. The rim of the wheel extending into the saw slot or space 16 permits any one of the saw setting elements or anvils 21 to be brought into a work engaging position within said slot or space. To hold the wheel against accidental rotation a set screw 23 is threaded in the upper member 11 of the frame and is adapted to be turned in engagement with the rim of the wheel with one of the anvils in engagement therewith. The wheel thus engaged by the set screw 23 will be held against accidental rotation and to free the wheel it is only necessary to back the set screw out of the path of the anvils or saw setting elements 21 and by placing a finger on the wheel where the latter projects beyond one end of the frame said wheel can be rotated to bring the desired anvil or saw setting element into proper position within the slot or space 16.

Slidably supported in the members 13, 14 and the curved portion of the member 11 is a force transmitting or driving pin 24. The pin 24 is capable of a limited upward and downward movement in the openings of the members 14 and 11 and is slidably received in a collar 25 to which is journaled a set screw 26 threaded in the member 11 of the frame 10. By raising or lowering the collar 25 through the manipulation of the set screw 26 the angle of inclination of one end of the pin 24 with respect to the work engaging face 22 of one of the anvils or saw setting elements 21 may be varied. An anchor pin 27 is secured on the pin or rod 24 between one of the members 13 and the member 14 to form a seat for one end of a coil spring 28, the other end of said spring bearing against one of the members 13. The spring acts normally to move the pin or rod 24 away from work engaging position or, in other words, away from the tooth of the saw to be set. The other end of the pin or rod 24 projects beyond the frame 10 and in the path of movement of a hammer 29. The hammer is pivotally mounted on the side plates 14 within the frame and is of a shape similar to the shape of an ordinary hammer found on a gun or pistol. The upper member 11 which forms a part of the grip 15 has a slot through which the hammer 29 operates. The pivoted end of the hammer is equipped with teeth 30 to be engaged by a pivoted dog 31. A spring 32 of the coil type has one end connected to the dog 31 and the other end connected to one of the side plates. The purpose of the spring is to keep one end of the dog in engagement with the teeth 30 on the hammer. The other end of the dog lies in the path of movement of one end of a trigger 33 pivotally mounted in a slot 34 formed in the lower member 11 of the frame 10. A suitable trigger guard 35 is formed on the lower member 11 of the frame 10 to protect the trigger. Formed on the hammer 29 adjacent its pivot is an extension 36 having a notch to receive one end of a leaf spring 37, the other end of said leaf spring being anchored in an end member of the handle 15. The upper and lower members 11 of the frame 10 which go to make up the handle 15 are connected in the handle portion by a member 38 having a slot through which extends the leaf spring 37. The end walls of the slot limit the flexing movement of the spring 37 in opposite directions. When the hammer 29 is moved into a cocked position the end of the leaf spring connected with the extension 36 moves past the dead center position relative to the pivot of the hammer, thereby holding the hammer in a cocked position, with the dog still remaining in engagement with the teeth 30 of the hammer and also in engagement with the trigger 33 so that when the trigger is pulled, it rocks the dog and the latter imparts force to the hammer 29. This force on the hammer causes the same to swing on its pivot, moving the extension 36 upwardly and as the extension passes the upward direction beyond the dead center position with respect to the pivot of the hammer, the hammer is driven by the influence of the leaf spring 37. The hammer being driven into pin striking position by the spring 37 will strike the pin or rod 24 with a uniform force each time it is operated.

The handle 15 has threaded therein a set screw 39. the inner end of which bears against the leaf spring 37 providing means whereby the tension of the spring 37 may be increased and decreased as desired. By increasing and decreasing the tension of the spring, its force of driving the hammer 29 may be varied.

In operation, the blade of a saw is positioned in the space 16 as indicated at A, with a tooth thereof brought opposite to the selected anvil or saw setting element positioned in the slot. The hammer 29 is moved into a striking position, permitting the spring 28 to act to position the pin or rod 24 a limited distance away from the tooth arranged opposite the anvil or saw setting element. When the blade of the saw is positioned as described in the space 16 one face thereof bears against the set screw 18 and by adjusting the latter the saw blade may be made to occupy a desired distance between the members 13 defining the space 16. The set screw 18 also cooperates with the active anvil or saw setting element in supporting the device properly on the saw. The trigger 33 is then pulled releasing the hammer 29 from a cocked position. The hammer striking the pin or rod 24 drives the work engaging end thereof against the tooth opposite the selected anvil or saw setting element so that the tooth will be set or bent to a desired pitch. After setting the tooth the position of the tool or device on the saw blade is shifted to bring the next tooth opposite the anvil or saw setting element and the same operation is again repeated. The hammer 29 being driven by the leaf spring 37 always strikes the teeth of the saw with a uniform force, that is, with one setting or adjustment of the spring 37 by the set screw 39. However, when it is desired to increase or decrease the driving force of the hammer the set screw 39 is adjusted to vary the tension of the spring.

A tool or saw set of the character described and as shown in the drawing is readily adaptable to various types of saws wherein the teeth thereof may be set to selected pitches through the bringing of the desired saw set element or anvil into work engaging position. This can be easily accomplished by releasing the set screw 23 from the rim of the wheel and rotating the latter manually.

It is believed that the foregoing description, when taken in connection with the drawing will fully set forth the construction and advantages of the present invention to those skilled in the art to which this device relates, so that further detailed description will not be required.

Having thus described my invention, what I claim is:

1. A portable saw set comprising a frame having a work space to receive a saw blade, a unit of saw set anvils rotatably mounted on the frame whereby any one of the anvils may be brought into a position opposite a tooth of the saw in said space, a striking rod, said frame having openings loosely receiving said rod to support the latter for sliding movement on the frame in an endwise direction with respect to said rod and in upward and downward directions on the frame for varying the inclination of the rod on said frame, a hammer pivoted on said frame for impelling the rod against the tooth positioned opposite the anvil to set the tooth to a pitch provided by the anvil, a leaf spring secured on the frame and acting on the hammer to drive the latter from a cocked position into a position for striking the rod, a trigger mechanism for releasing said hammer, means for adjusting the tension of the spring, a spring acting on said rod to cause the latter to follow the movement of the hammer into the cocked position, and means for adjusting the inclination of the rod.

2. A portable saw set comprising a frame having a work space to receive a saw blade, a unit of saw set anvils rotatably mounted on the frame whereby any one of the anvils may be brought into a position opposite a tooth of the saw in said space, a striking rod, said frame having openings loosely receiving said rod to support the latter for sliding movement on the frame in an endwise direction with respect to said rod and in upward and downward directions on the frame for varying the inclination of the rod on said frame, a hammer pivoted on said frame for impelling the rod against the tooth positioned opposite the anvil to set the tooth to a pitch provided by the anvil, a leaf spring secured on the frame and acting on the hammer to drive the latter from a cocked position into a position for striking the rod, a trigger mechanism for releasing said hammer, means for adjusting the tension of the spring, a spring acting on said rod to cause the latter to follow the movement of the hammer into the cocked position, a set screw threaded in said frame and rotatably connected to said rod for adjusting the inclination of said rod.

3. A portable saw set comprising a frame having a work space to receive a saw blade, a unit of saw set anvils rotatably mounted on the frame whereby any one of the anvils may be brought into a position opposite a tooth of the saw in said space, a striking rod, said frame having openings loosely receiving said rod to support the latter for sliding movement on the frame in an endwise direction with respect to said rod and in upward and downward directions on the frame for varying the inclination of the rod on said frame, a hammer pivoted on said frame for impelling the rod against the tooth positioned opposite the anvil to set the tooth to a pitch provided by the anvil, a leaf spring secured on the frame and acting on the hammer to drive the latter from a cocked position into a position for striking the rod, a trigger mechanism for releasing said hammer, means for adjusting the tension of the spring, a spring acting on said rod to cause the latter to follow the movement of the hammer into the cocked position, a set screw threaded in said frame and rotatably connected to said rod for adjusting the inclination of said rod, and a set screw carried by the frame to engage one face of the saw blade to cooperate with the anvil positioned in work-engaging position in supporting the saw blade.

4. A portable saw set comprising a frame having a work space to receive a saw blade, a unit of saw set anvils rotatably mounted on the frame whereby any one of the anvils may be brought into a position opposite a tooth of the saw in said space, a striking rod, said frame having openings loosely receiving said rod to support the latter for sliding movement on the frame in an endwise direction with respect to said rod and in upward and downward directions with respect to said frame for varying the inclination of the rod on said frame, means connected to said rod and frame for adjusting the rod upwardly and downwardly, a hammer pivoted on said frame for impelling the rod against the tooth positioned opposite the anvil to set the tooth to a pitch provided by the anvil, an extension formed on said hammer and having a notch, a leaf spring having one end secured in the frame and fitting in the notch, means for varying the tension of said spring, teeth formed on the pivoted end of the hammer, a dog pivoted on the frame, a spring connected to said dog and to said frame to urge one end thereof in engagement with the teeth, a trigger carried by the frame to engage the other end of the dog, and a guard carried by the frame for said trigger.

BROWNLOW FIELDS.